United States Patent
Baxendell

(10) Patent No.: US 10,024,454 B2
(45) Date of Patent: Jul. 17, 2018

(54) ACTUATORS FOR HAZARD DETECTION AND SUPPRESSION SYSTEMS

(71) Applicant: Kidde Technologies, Inc., Wilson, NC (US)

(72) Inventor: Doug J. Baxendell, Clayton, NC (US)

(73) Assignee: Kidde Technologies, Inc., Wilson, NC (US)

( * ) Notice: Subject to any disclaimer, the term of this patent is extended or adjusted under 35 U.S.C. 154(b) by 62 days.

(21) Appl. No.: 15/216,645

(22) Filed: Jul. 21, 2016

(65) Prior Publication Data

US 2018/0023721 A1      Jan. 25, 2018

(51) Int. Cl.
| A62C 37/46 | (2006.01) |
| F16K 31/08 | (2006.01) |
| A62C 37/48 | (2006.01) |
| F16K 31/06 | (2006.01) |

(52) U.S. Cl.
CPC ............ *F16K 31/082* (2013.01); *A62C 37/46* (2013.01); *A62C 37/48* (2013.01); *F16K 31/0675* (2013.01)

(58) Field of Classification Search
CPC . F16K 31/082; Y10T 137/1963; A62C 37/04; A62C 37/36; A62C 37/44
USPC ........................ 251/65; 137/79; 335/229, 230
See application file for complete search history.

(56) References Cited

U.S. PATENT DOCUMENTS

| 4,890,815 A | 1/1990 | Hascher-Reichl et al. |
| 5,010,911 A | 4/1991 | Grant |
| 5,497,135 A * | 3/1996 | Wisskirchen ......... H01F 7/1615 335/229 |
| 6,068,010 A * | 5/2000 | Reinicke .................. B64G 1/26 251/65 |
| 7,740,081 B2 | 6/2010 | Edwards et al. |
| 9,033,309 B2 * | 5/2015 | Rampen ................ F04B 7/0076 251/65 |
| 9,038,742 B2 * | 5/2015 | Porterfield, Jr. ........ A62C 37/40 169/46 |

FOREIGN PATENT DOCUMENTS

| DE | 102013210881 A1 | 12/2014 |
| EP | 2602521 A2 | 6/2013 |
| GB | 673923 A | 6/1952 |
| WO | WO-2010/141733 A1 | 12/2010 |

OTHER PUBLICATIONS

Extended European Search Report dated Dec. 19, 2017, issued during the prosecution of European Patent Application No. EP 17174900.5 (9 pages).

* cited by examiner

*Primary Examiner* — Eric Keasel
(74) *Attorney, Agent, or Firm* — Locke Lord LLP; Scott D. Wofsy; Christopher J. Cillié

(57) ABSTRACT

An actuator includes a housing with a first end, a second end opposite the first end, and a bore disposed therein. The bore defines a poppet movement axis and extends between the first end and second end of the housing. A solenoid is disposed within the bore and extends about the poppet movement axis. An armature is disposed within the bore and is movable along the poppet movement axis between a disengaged position and an engaged position, the engaged position proximate the solenoid and the disengaged position spaced apart from the solenoid. A magnet is disposed within the bore between the first end of the housing and the armature, the magnet magnetically coupled to the armature to bias the armature towards the disengaged position.

16 Claims, 5 Drawing Sheets

ACTUATORS FOR HAZARD DETECTION AND SUPPRESSION SYSTEMS

BACKGROUND OF THE INVENTION

1. Field of the Invention

The present disclosure relates to hazard detection and suppression systems, and more particularly to actuators for valve assemblies in hazard detection and suppression systems.

2. Description of Related Art

Hazard detection and suppression systems, such as vehicular fire suppression systems, commonly include a suppressant charge retained within reservoir under pressure. The suppressant charge is generally retained under pressure by a release mechanism that, upon recognition that a hazard is present within a space of interest, is tripped. Tripping the release mechanism typically allows the suppressant charge to flow into the protected space, thereby suppressing the hazard and generally preventing the recognized hazard from developing into a more significant hazard.

Release mechanisms are typically operable to retain the suppressant charge for extended time intervals at pressure absent the release mechanism being tripped. Retention is generally accomplished by a latch or similar retaining arrangement, which typically biases a movable element within the release mechanism to prevent release of suppressant without a trigger event. The latch is typically selected to generate sufficient force to overcome environmental influences on the release mechanism, such as thermal, pressure, and dynamics loads exerted on the release mechanism during the time interval that the release mechanism is not tripped.

Such conventional methods and systems have generally been considered satisfactory for their intended purpose. However, there is still a need in the art for improved actuators for hazard detection and suppression systems. The present disclosure provides a solution for this need.

SUMMARY OF THE INVENTION

An actuator includes a housing with a first end, a second end opposite the first end, and a bore. The bore defines a poppet movement axis and extends between the first end and second end of the housing. A solenoid is disposed within the bore and extends about the poppet movement axis. An armature is disposed within the bore and is movable along the poppet movement axis between a disengaged position and an engaged position, the engaged position proximate the solenoid and the disengaged position spaced apart from the solenoid. A magnet is disposed within the bore between the first end of the housing and the armature, the magnet magnetically coupled to the armature to bias the armature towards the disengaged position.

In certain embodiments, the housing can define an armature stop. The armature stop can be disposed within the bore between the first end of the housing and the solenoid. The armature stop can bound the disengaged position of the armature. The magnet can be radially offset from the armature stop. A ferromagnetic body can be disposed between the magnet and the first end of the housing. The ferromagnetic body can be radially offset from the armature stop. The magnet can be fixed relative to the ferromagnetic body. The magnet can be a first magnet, and the assembly can include a second magnet disposed diametrically opposite the first magnet.

In accordance with certain embodiments, the housing can define a set bore. The set bore can extend between the first end of the housing and the bore. The magnet can be movably disposed within the set bore. The magnet can be threadably seated within the set bore. The ferromagnetic body can be threadably seated within the set bore. The ferromagnetic body and the magnet can be fixed to a magnet carrier threadably seated in the set bore. The magnet can have an armed position and a disarmed position. It is contemplated that the disarmed position can be proximate the armature; the disarmed position can be spaced apart from the armature.

It is also contemplated that, in accordance with certain embodiments, a poppet can be movably disposed within the bore between closed and open positions. The open position can be proximate the solenoid; the closed position can be spaced apart from the solenoid. A collet can be disposed within the bore and can longitudinally overlap the poppet along the poppet movement axis. The collet can be splayed to release the poppet from the poppet fixed position. A locking ring can be disposed within the bore and longitudinally overlap the collet. The locking ring can be axially movable along the poppet movement axis between locked and unlocked positions. A striker can be disposed within the bore between the locking ring and the armature to axially displace the locking ring, thereby allowing the poppet to splay the collet and move from the closed position to the open position along the poppet movement axis. A spring can be disposed between the housing and the armature to bias the armature toward the disengaged position.

A valve assembly includes a valve boss with a poppet and an actuator as described above. The valve boss has an inlet, outlet, and an actuator seat. The actuator is fixed to the actuator seat. When the armature moves from the disengaged position to the engaged position the poppet moves from the open position to the closed position, the poppet thereby placing the inlet of the valve boss in fluid communication with the outlet of the valve boss.

A detection and suppression system includes a pressure vessel containing a suppressant, a valve assembly as described above, and a controller communicative with a detector and operably connected to the actuator. When the controller energizes the solenoid the armature displaces, thereby causing the poppet cause suppressant to issue from the pressure vessel.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
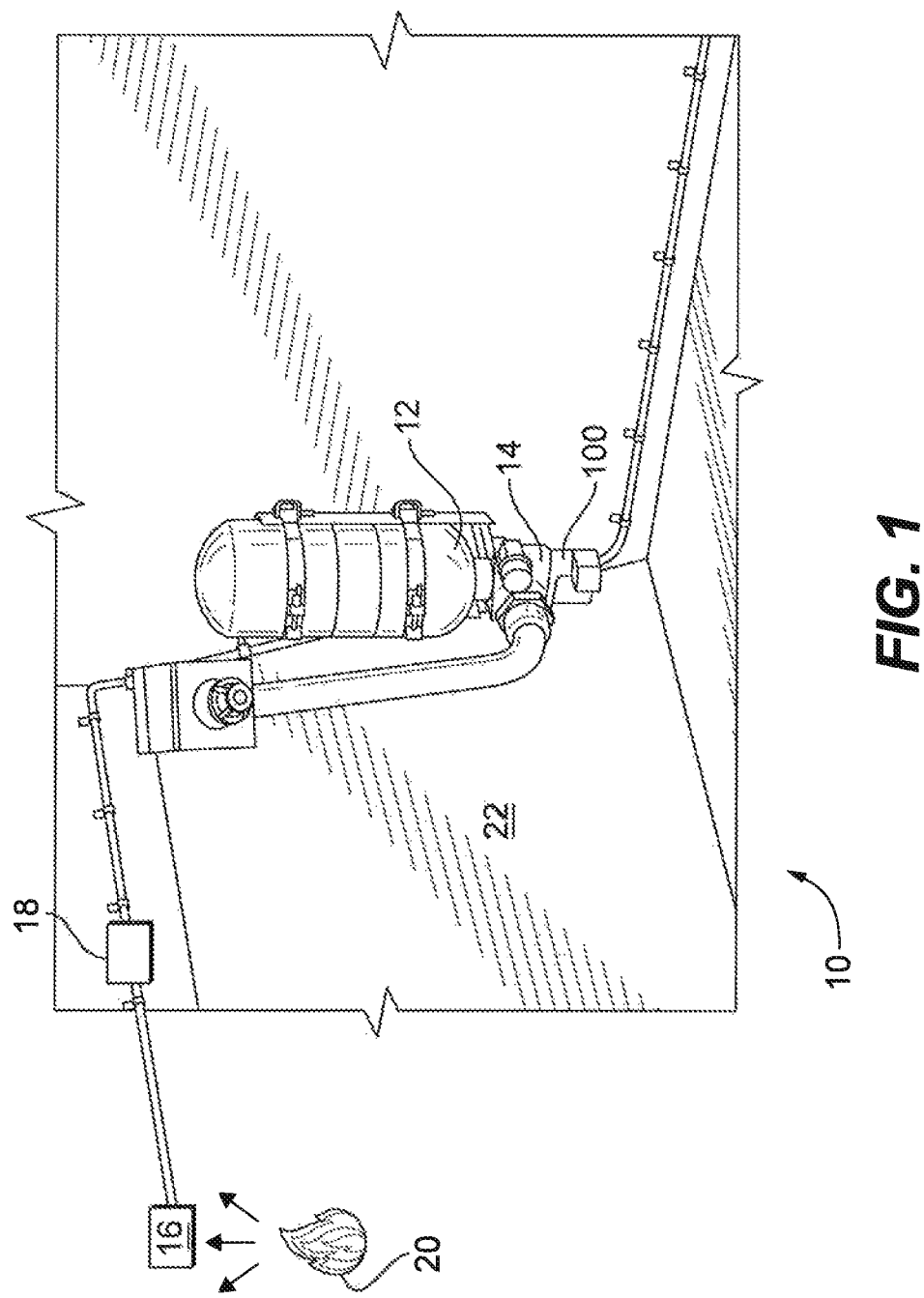
FIG. 1 is a perspective view of an exemplary embodiment of a detection and suppression system constructed in accordance with the present disclosure, showing a pressure vessel containing a suppressant with a valve assembly and actuator disposed within a protected space.

Reference will now be made to the drawings wherein like reference numerals identify similar structural features or aspects of the subject disclosure. For purposes of explanation and illustration, and not limitation, a partial view of an exemplary embodiment of an actuator in accordance with the disclosure is shown in FIG. 1 and is designated generally by reference character 100. Other embodiments of actuators, valve assemblies operably connected to actuators, and detection and suppression systems having such actuated valve assemblies in accordance with the disclosure, or aspects thereof, are provided in FIGS. 2-5, as will be described. The systems and methods described herein can be used fire detection and suppression systems in vehicles like aircraft, though the present disclosure is not limited vehicular applications nor to the fire detection and suppression systems generally.

Referring to FIG. 1, a detection and suppression system 10 is shown. Detection and suppression system 10 includes a pressure vessel 12, a valve assembly 14, and an actuator 100. Detection and suppression system 10 also includes a detector 16 and a controller 18. Detector 16 is configured and adapted to detect the presence of flame 20, e.g., by recognition of associated infrared energy, ultraviolet energy, and/or thermal energy, within a protected space 22. Controller 18 is communicative with detector 16 and is operatively connected actuator 100 such that, upon detection of the presence of flame 20 within protected space 22, actuator 100 opens valve assembly 14 such that suppressant contained within pressure vessel 12 issues into protected space 22.

Figure 2A:
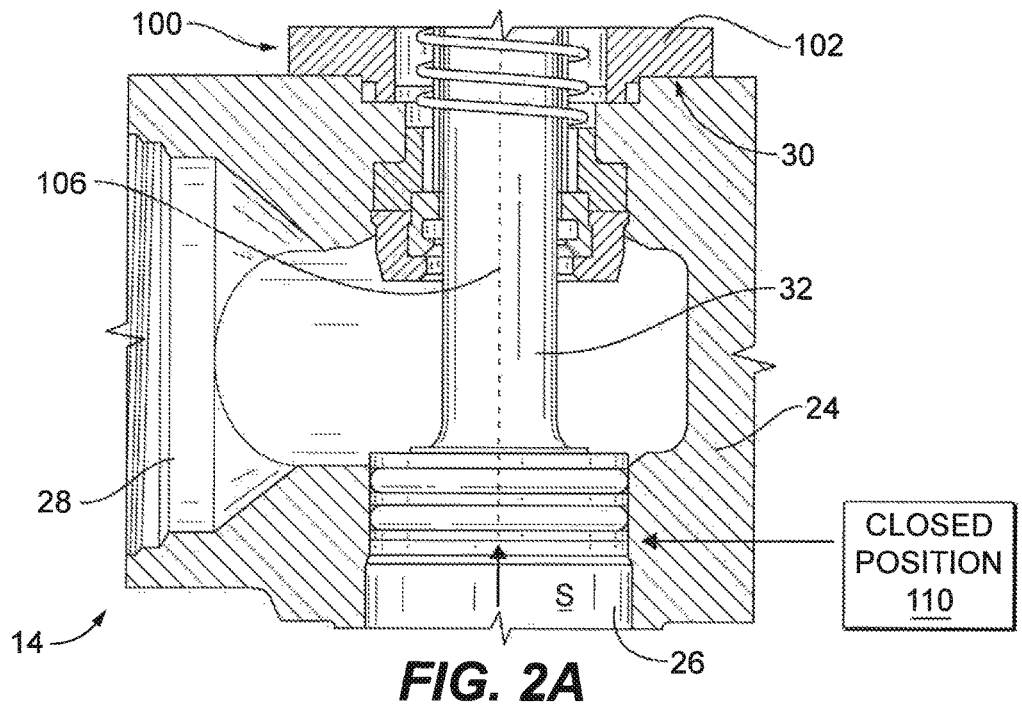
FIGS. 2A and 2B are cross-sectional side elevation views of the valve assembly of FIG. 1, showing a poppet of the actuator assembly in a closed position an open position wherein suppressant issues from the pressure vessel, respectively.
Figure 2B:
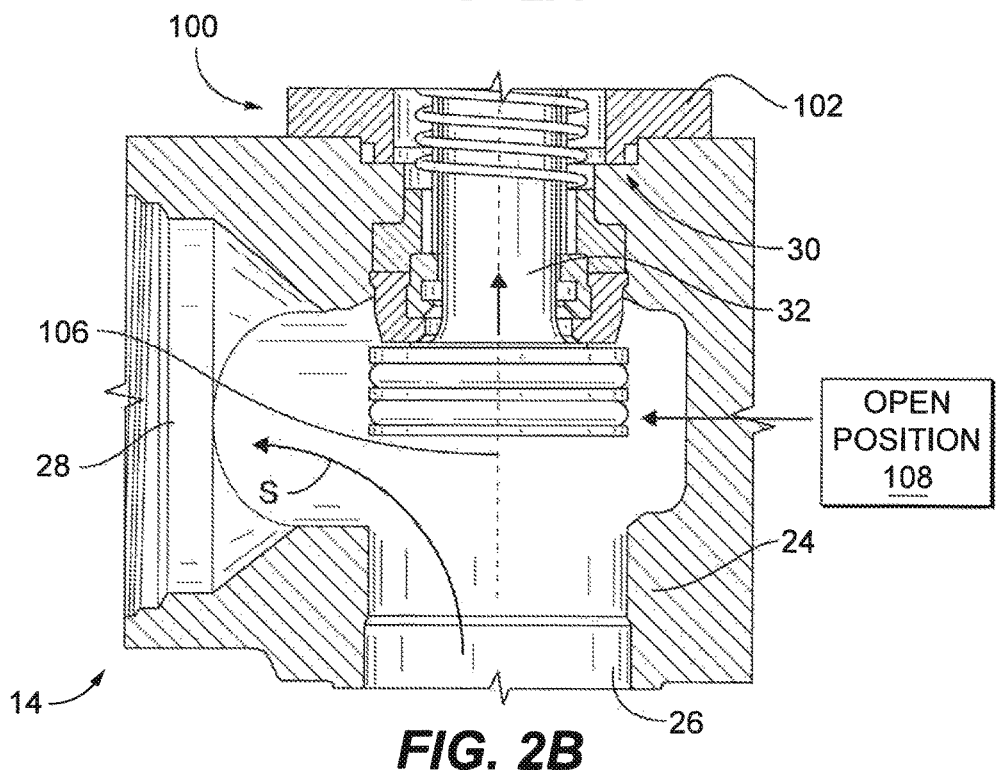

With reference to FIGS. 2A and 2B, valve assembly 14 is shown. Valve assembly 14 includes a valve boss 24 with an inlet 26, an outlet 28, an actuator seat 30, and a poppet 32. Poppet 32 is slideably received within valve boss 24 along a poppet movement axis 106 between a closed position 110 (shown in FIG. 2A) and an open position 108 (shown in FIG. 2B).

A housing 102 of actuator 100 is fixed to actuator seat 30 such that fluid communication between inlet 26 and outlet 28 is determined according to the position of poppet 32. In this respect, when poppet 32 in the closed position 110 (shown in FIG. 2A), inlet 26 is fluidly separated from outlet 28. As will be appreciated by those of skill in the art in view of the present disclosure, this confines suppressant S within pressure vessel 12 (shown in FIG. 1). When poppet 32 moves from closed position 110 to the open position 108 (shown in FIG. 2B), displacement of poppet 32 places inlet 26 is in fluid communication with outlet 28 such that suppressant S issues from outlet 28.

Figure 3A:
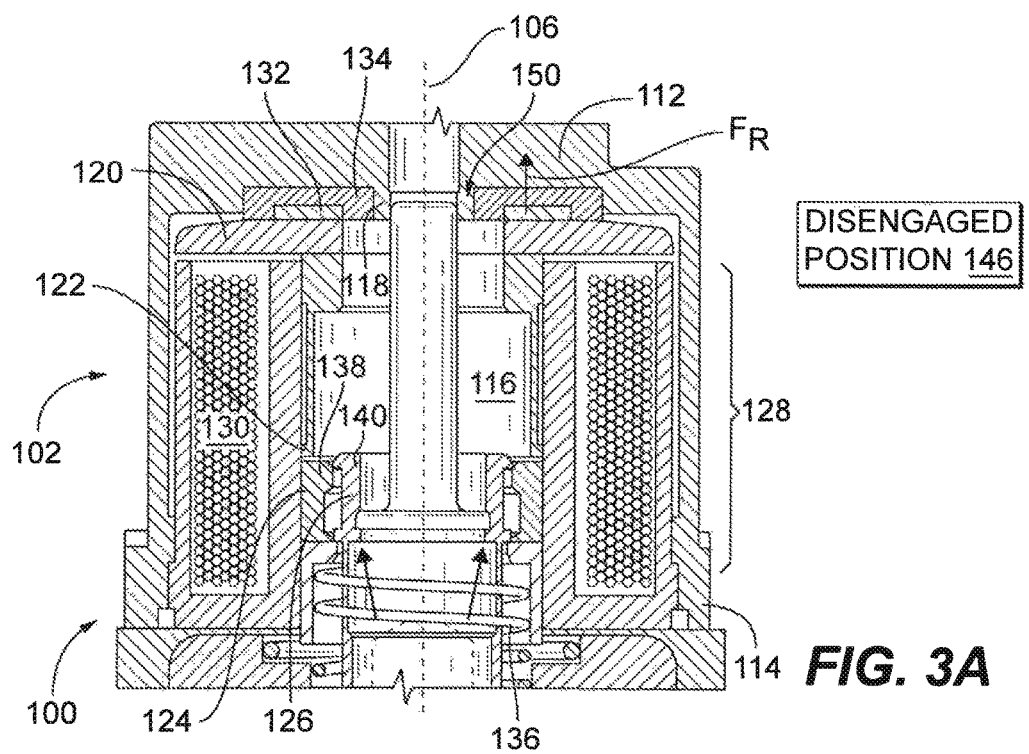
FIGS. 3A and 3B are cross-sectional side elevation views of the actuator of FIG. 1, showing an armature of the actuator is a disengaged position and an engaged position, respectively.
Figure 3B:
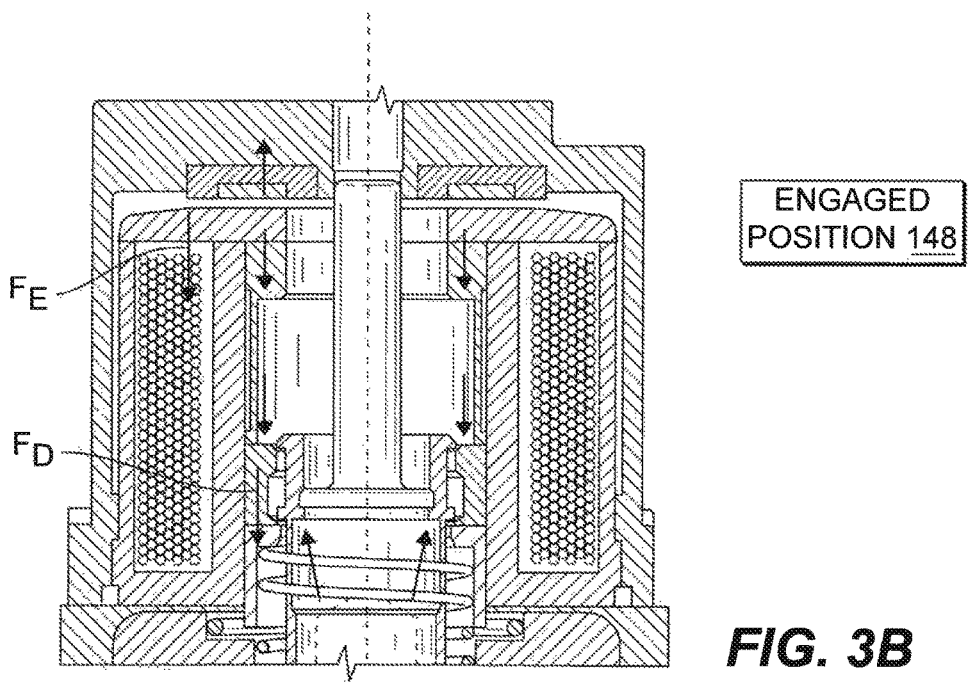

With reference FIGS. 3A and 3B, actuator 100 is shown. Housing 102 has a first end 112, a second end 114 opposite first end 112, and defines a bore 116 disposed between first end 112 and second end 114. Poppet movement axis 106 extends through bore 116 between first end 112 and second end 114 of housing 102. An armature stop 118 is disposed within housing 102 at an end of bore 116 proximate to first end 112.

Actuator 100 includes an armature 120 with a striker portion 122, a locking ring 124, and a collet 126. Actuator 100 also includes a solenoid 128 with a coil 130, a magnet 132, and a ferromagnetic body 134. Ferromagnetic body 134, magnet 132, armature 120, and solenoid 128 are axially stacked within bore 116 between first end 112 and second end 114 of housing 102. Armature 120, striker portion 122, and locking ring 124 are axially stacked within bore 116 between armature stop 118, proximate first end 112 of housing 102, and second end 114 of housing 102. A biasing member 136 is disposed axially on a side of locking ring 124 opposite striker portion 122, urging locking ring 124 into intimate mechanical contactor with armature 120 through striker portion 122.

Striker portion 122 extends circumferentially about poppet movement axis 106 and is axially stacked between armature 120 and locking ring 124. Locking ring 124 extends about poppet movement axis 106, is disposed axially on a side of striker portion 122 opposite armature 120, and includes at least one radially inner flange 138. Radially inner flange 138 extends radially inward from striker portion 122 towards poppet movement axis 106.

Collet 126 is disposed radially inward of locking ring 124 and extends circumferentially about poppet movement axis 106. Collet 126 has at least annular flange 140 extending radially outward from collet 126. Locking ring 124 longitudinally overlaps collet 126 and poppet 32, which extend along poppet movement axis 106.

Poppet 32 extends axially along poppet movement axis 106, bore 116 between first end 112 and second end 114 of housing 102, and though a central aperture 150 defined in armature 120. This allows poppet 32 and armature 120 to move relative to one another. In this respect, application of electric current to coil 130 of solenoid 128 exerts an engagement force $F_E$ (shown in FIG. 3B) on a ferromagnetic material forming armature 120, thereby displacing armature 120 from disengaged position 146 (shown in FIG. 3A) to engaged position 148 (shown in FIG. 3B).

Displacing armature 120 from disengaged position 146 to engaged position 148 drives striker portion 122 against locking ring 124, striker portion 122 thereby exerting a locking ring driving force $F_D$ (shown in FIG. 3B) on locking ring 124. Locking ring driving force $F_D$ translates locking ring 124 axially relative to collet 126, thereby displacing locking ring 124 axially relative to the collet 126. The axial displacement of locking ring 124 interrupts the radial alignment of radially inner flange 138 of locking ring 124 and radially outer flange 140 of collet 126, axially displacing radially inner flange 138 relative to radially outer flange 140. The shift of radially inner flange 138 of locking ring 124 relative to radially outer flange 140 of collet 126 causes force resident on the face of collet 126 in pressure vessel 24 (shown in FIGS. 2A and 2B) to splay collet 126 radially outward, allowing poppet 32 to move from closed position 110 (shown in FIG. 2A) to open position 108 (shown in FIG. 2B). This places inlet 26 (shown in FIG. 2A) and outlet 28

(shown in FIG. 2B) in fluid communication with one another, thereby allowing suppressant S to issue from outlet 28.

With continuing reference to FIGS. 3A and 3B, magnet 132 changes the dynamics of armature 120 to the electromotive motive force $F_E$ applied to armature 120 by solenoid 128. In this respect magnet 132 is fixed to housing 102 on an end of bore 116 adjacent to first end 112 of housing 102 between armature 126 and housing 102, and exerts a retention force $F_R$ on armature 120. Retention force $F_R$ biases the position of armature 128 along poppet movement axis 106 toward first disengaged position 146. It is contemplated that magnet 132 include a material such as neodymium, which causes magnet 132 to exert an extremely high retention force $F_R$ (shown in FIG. 3A) on armature 120 when armature 120 is proximate magnet 132, e.g., when armature 120 is in disengaged position 146.

The retention force $F_R$ exerted on armature 120 has two effects. First, retention force $F_R$ delays the start of movement of armature 120 in response to current being applied to coil 130 of solenoid 128. Second, because retention force $F_R$ delays departure of armature 120 from disengaged position 146, solenoid 128 generates a larger magnetic flux than would otherwise by the case. The relatively high magnetic flux and rapid drop off of retention force $F_R$ cause armature 120 to accelerate rapidly and produce a greater impact force velocity of armature 120 on solenoid 128. It is contemplated that armature 120 be released about 0.5 milliseconds later than otherwise would be the case. It is further contemplated that armature 120 impact at about the same time or sooner for a given gap distance that otherwise would be the case owning to acceleration of armature 120.

The strength of retention force $F_R$ corresponds strongly with the distance between armature 120 and magnet 132. In this respect, when armature 120 is abuts magnet 132 retention force $F_R$ is extremely strong. It is contemplated that magnet 132 exert a retention force $F_R$ that drops off rapidly (e.g., logarithmically) as function of the distance separation between magnet 132 and armature 120. In the illustrated exemplary embodiment, the neodymium material of magnet 132 generates a retention force $F_E$ that is higher than that of a retention spring or similar structure. This relative high retention force $F_R$ delays movement of armature 120 from the disengaged position upon actuation of solenoid 128 until such time that solenoid 128 generates an engagement force $F_E$ greater than that retention force $F_R$. As will be appreciated by those of skill in the art in view of the present disclosure, this causes engagement force $F_E$ to be higher than would otherwise be the case were an engagement spring or similar structure employed, causing armature 120 to accelerate more rapidly from disengaged position 146, thereby impacting locking ring 124 with a greater impact velocity.

With reference to FIG. 3A, ferromagnetic body 134 is disposed on a side of armature 120 opposite solenoid 128. Magnet 132 is fixed to ferromagnetic body 134 and arranged axially between ferromagnetic body 134 and armature 120. This arrangement further amplifies the retention force $F_R$ exerted on armature 120 by magnet 132. For example, in a contemplated embodiment the retention force of an neodymium magnet 132 having a diameter of about 0.25 inches and a width of about 0.03 inches increases by about 40% while providing substantially the same velocity (and thus impulse) to armature 120. It is to be understood and appreciated that more than one magnet 132 can be included in actuator 100, the illustrated exemplary embodiment having a first magnet 132 and a second magnet 132 disposed on diametrically opposite sides of poppet movement axis 106. As will be appreciated by those of skill in the art in view of the present disclosure, having a first magnet 132 and a second magnet 132 disposed on diametrically opposite sides of poppet movement axis 106 balances the retention force $F_R$ exerted on armature 120, evening distributing the force across the diameter of the armature body spanning solenoid 128. The diametrically opposed first magnet 132 and second magnet 132 can also be disposed radially inward of coil 130, improving flux distribution between armature 120 and coil 130 when receiving electrical current.

Figure 4A:
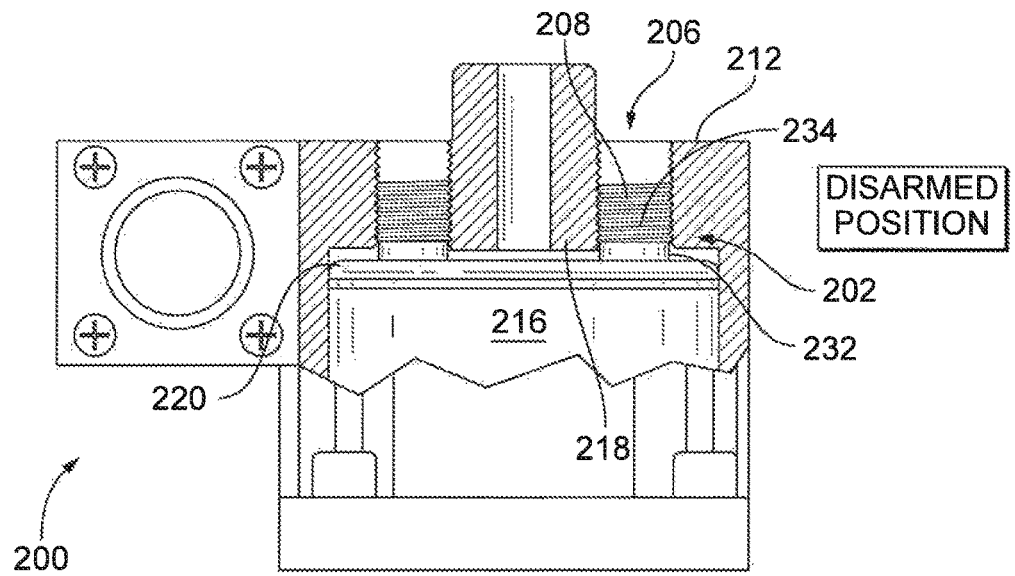
FIGS. 4A and 4B are cross-sectional side elevation views of a second embodiment of an actuator, showing a magnet movably disposed within a set bore between an armed position and a disarmed position.
Figure 4B:
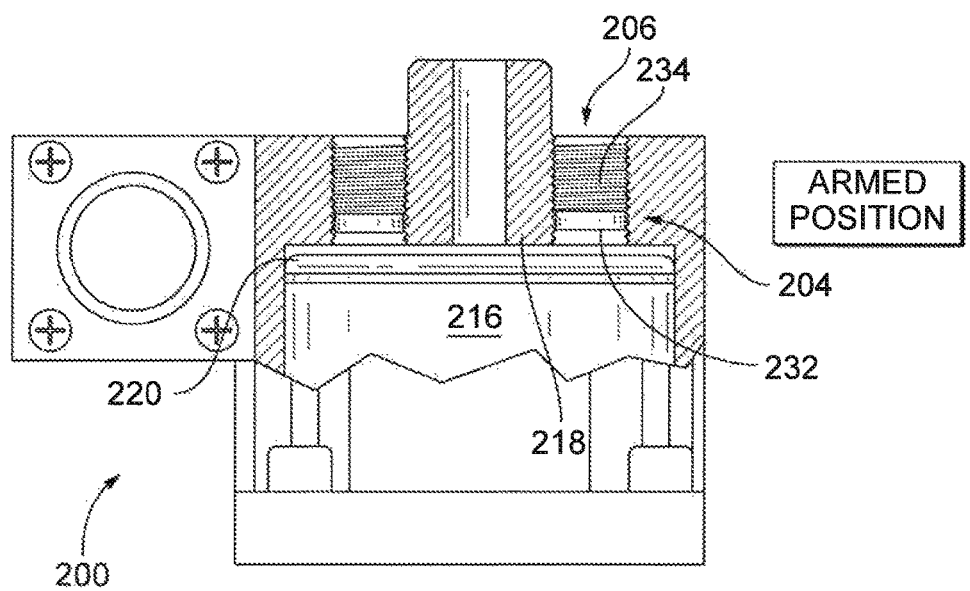

With reference to FIGS. 4A and 4B, an actuator 200 is shown. Actuator 200 is similar to actuator 100, and additionally includes a magnet 232 having a disarmed position 202 (shown in FIG. 4A) and an armed position 204 (shown in FIG. 4B). In the armed position 204, magnet 232 is spaced apart from armature 220 on a side of armature stop 218 opposite armature 220, and functions as described above. In the disarmed position 202, magnet 232 is proximate (or in contact with) armature 220. Positioning magnet 232 proximate (or in contact with) armature 220 renders armature 220 less prone to displacement due to shock and impact events, reducing the likelihood of an untriggered actuation of a valve assembly coupled to actuator 200. This can be advantageous when armature 220 is relatively massive, thereby being more susceptible to inadvertent movement due to shock and/or impact events.

As shown in FIGS. 4A and 4B, housing 201 defines a set bore 206. Set bore 206 extends between housing first end 212 and bore 216. Magnet 232 is movably disposed within set bore 206, and in the illustrated exemplary embodiment is threadably seated within set bore 206. Magnet 232 and/or ferromagnetic body 234 can be threadably seated within set bore 206, such as to a magnet carrier 208 threadably seated within set bore 206. It is contemplated that magnet 232 (and ferromagnetic body 234/magnet carrier 208) can moved to disarmed position 202 for shipping and/or transport, and thereafter can be moved to armed position 204 for purposes of configuring detection suppression system 10 for use.

Figure 5:
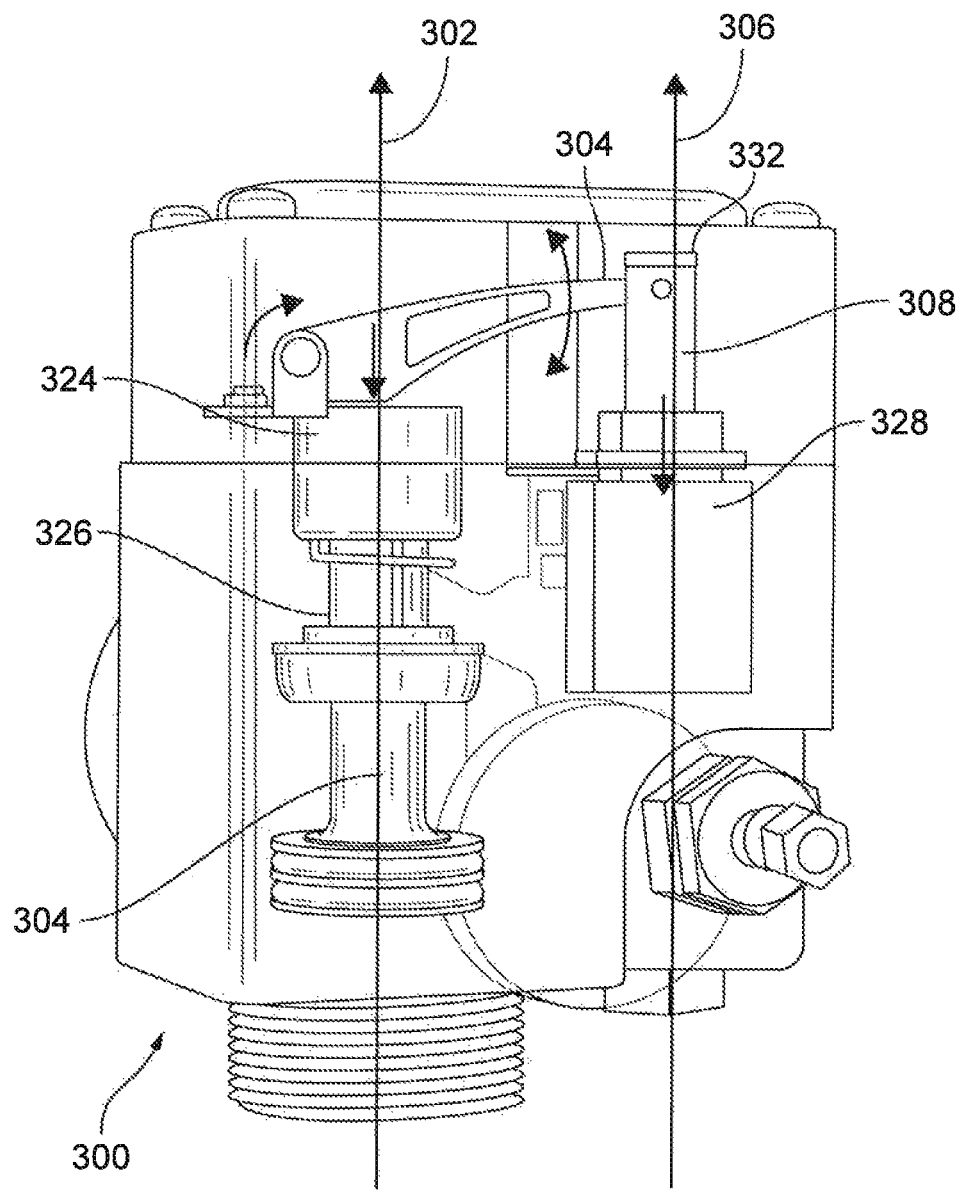
FIG. 5 is a cross-sectional side elevation view of a third embodiment of an actuator, showing a solenoid coaxial with a magnet, the solenoid and magnet both being axially offset from the poppet movement axis.

With reference to FIG. 5, an actuator 300 is shown. Actuator 300 is similar to actuator 100, and additionally includes a solenoid 328 operatively connected to a poppet 304 by a lever linkage 304. Poppet 304 is movable along a poppet movement axis 302, is restrained by a collet 326 and locking ring 324 as described above, and is axially offset from a solenoid movement axis 306. Magnet 332 is seated coaxially along solenoid movement axis 306 and is axially offset from poppet movement axis 302.

As will be appreciated by those of skill in the art in view of the present disclosure, lever linkage 304 provides mechanical advantage. The mechanical advantage provided by lever linkage 304 allows solenoid 328 to be relatively small compared to an axially arranged solenoid for a given lock ring/collet arrangement. Being relatively small, solenoid 328 can be more apt to move in response to vibratory forces exerted on solenoid 328, such as from movement of a vehicle mounting actuator 300, potentially increasing the likelihood of uncommanded discharge events. Magnet 332 reduces the responsiveness of solenoid 328 to external vibratory forces due to the relatively high retention force generated by magnet 332, which is greater than that provided by a spring element or similar arrangement.

The methods and systems of the present disclosure, as described above and shown in the drawings, provide for actuators, valve assemblies, and detection and suppression systems with superior properties including improved reliability and armature response to trigger events. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An actuator, comprising:
a housing having a first end, a second end opposite the first end, and a bore defining a poppet movement axis extending between the first end and the second end of the housing;
a solenoid disposed within the bore and extending about the poppet movement axis;
an armature disposed within the bore and movable between an engaged position and a disengaged position, the engaged position being proximate the solenoid, the disengaged position being spaced apart from the solenoid;
a magnet disposed within the bore between the armature first end of the housing, the magnet being magnetically coupled to the armature to bias the armature towards the armature disengaged position;
a poppet movably disposed within the bore between a closed position and an open position, the open position being proximate the solenoid and the closed position being spaced apart from the solenoid;
a collet disposed within the bore and longitudinally overlapping the poppet along the poppet movement axis, the collet being laterally movable between poppet-fixed position and a poppet-freed position;
a locking ring disposed within the bore and longitudinally overlapping the collet, the locking ring being movable along the poppet movement axis between a locked position and an unlocked position; and
a striker disposed within the bore between the locking ring and the armature, the striker axially overlapping both the armature and the locking ring to axially displace the locking ring and allow the poppet to move along the poppet movement axis.

2. The actuator as recited in claim 1, wherein the housing defines an armature stop disposed within the bore between the first end of the housing and the solenoid, the armature stop bounding the disengaged position of the armature.

3. The actuator as recited in claim 1, wherein the magnet is a first magnet and further comprising at least one second magnet, the second magnet being disposed on a side of the poppet movement axis laterally opposite the first magnet.

4. The actuator as recited in claim 1, wherein the magnet has an armed and a disarmed position, the disarmed position proximate the solenoid, the armed position spaced apart from the solenoid.

5. The actuator as recited in claim 1, further comprising a ferromagnetic body disposed within the bore between the first end of the housing and the magnet.

6. The actuator as recited in claim 1, wherein housing has a set bore extending axially from the first end of the housing to the bore, the magnet being movably disposed within the set bore.

7. The actuator as recited in claim 6, further comprising a magnet carrier threadably seated within the magnet bore and fixed to the magnet.

8. The actuator as recited in claim 1, wherein the magnet is coaxial with the poppet movement axis.

9. The actuator as recited in claim 1, further comprising further comprising a magnet carrier threadably seated within the magnet bore and fixed to the magnet.

10. The actuator as recited in claim 1, wherein the magnet is axially offset from the poppet movement axis.

11. A detection and suppression system, comprising:
a pressure vessel containing a suppressant;
a valve assembly having an actuator as recited in claim 8; and
a controller communicative with a detector and operably connected to the actuator, the controller configured and adapted to energize the solenoid, displace the armature, and enable movement of the poppet to the open position such that the suppressant issues from the pressure vessel.

12. A valve assembly, comprising:
a valve boss with an inlet, outlet, and an actuator seat;
an actuator as recited in claim 1 fixed to the actuator seat of the valve boss; and
a poppet movably disposed within the bore of the actuator between a closed position and an open position, the open position of the poppet being proximate the solenoid, the closed position being spaced apart from the solenoid,
wherein the armature is operably connected to the poppet such that (a) the inlet is fluidly isolated from the outlet when the armature is in the disengaged positon, and (b) the inlet is in fluid communication with the outlet when the armature is in the engaged position.

13. The valve assembly as recited in claim 12, wherein the magnet has an armed and a disarmed position, the disarmed position proximate the solenoid, the armed position spaced apart from the solenoid.

14. The valve assembly as recited in claim 12, further comprising a ferromagnetic body disposed within the bore between the first end of the housing and the magnet.

15. The valve assembly as recited in claim 12, wherein housing has a set bore extending axially from the first end of the housing to the bore, the magnet being movably disposed within the set bore.

16. The valve assembly as recited in claim 15, further comprising a magnet carrier threadably seated within the magnet bore and fixed to the magnet.

* * * * *